United States Patent [19]

Vetter et al.

[11] Patent Number: 4,547,092

[45] Date of Patent: Oct. 15, 1985

[54] ACCESSORY CLAMP FOR MEDICAL TABLE

[75] Inventors: Gary V. Vetter, Valders; Leonard J. Yindra, Manitowoc; Wilbur E. Gilbert, Two Rivers, all of Wis.

[73] Assignee: Hamilton Industries, Two Rivers, Wis.

[21] Appl. No.: 582,177

[22] Filed: Feb. 21, 1984

[51] Int. Cl.$^4$ ............................................. F16C 11/00
[52] U.S. Cl. .................................... 403/59; 403/389; 403/97; 403/55; 248/296; 248/229; 269/328
[58] Field of Search ...................... 403/59, 55, 68, 97, 403/373, 389, 80, 381, 331; 248/124, 288.1, 296, 514, 229; 269/328; 24/115 H, 115 G, 136 B, 135, 130, 486; 33/473, 412

[56] References Cited

U.S. PATENT DOCUMENTS

| | | | |
|---|---|---|---|
| 2,456,505 | 12/1948 | Hastings | 403/59 |
| 2,733,035 | 1/1956 | Rocheleau | 248/124 |
| 3,046,072 | 7/1962 | Douglass, Jr. et al. | 269/328 |
| 3,339,913 | 9/1967 | Anderson | 248/298 X |
| 3,581,354 | 6/1971 | Usiskin | 248/229 X |
| 3,677,584 | 7/1972 | Short | 403/389 |
| 3,810,462 | 5/1974 | Szpur | 269/328 X |
| 4,018,412 | 4/1977 | Kees, Jr. et al. | 24/486 X |
| 4,050,661 | 9/1977 | Wooldridge | 248/296 X |

Primary Examiner—Cornelius J. Husar
Assistant Examiner—Todd G. Williams
Attorney, Agent, or Firm—Tilton, Fallon, Lungmus

[57] ABSTRACT

An improved clamp for releasably and adjustably securing accessories, such as hanger rods for parenteral solution containers, to medical tables. The clamp has a generally cylindrical body comprising two main sections arranged in axial alignment: a base section and a cup section. Annular rows of intermeshing teeth are provided along the opposing end faces of the respective sections to prevent relative rotation of those sections unless such movement is accompanied by slight axial separation. The cup section includes a chamber terminating in an enlarged end opening that rotatably receives the cylindrical shank of a first operating knob. The knob is threadedly supported upon a hollow stem which is joined at one end to the base section and which extends axially through the chamber of the cup section. A pair of generally triangular openings in the side wall of the cup section receive the rod of a suitable accessory to be supported by the clamp, and a thrust bearing is urged by the shank portion of the first operating knob into tight engagement with the rod to secure it in place. Within the chamber is a compression spring that holds the thrust bearing an engagement with the shank of the operating knob and simultaneously urges the teeth of the respective sections into intermeshing engagement. A second operating knob, disposed immediately adjacent the first knob, is carried by an operating shaft that extends through the hollow stem and continues through the base section to an axially-movable clamping shoe arranged for releasably securing the entire clamp to the channel track of a medical table.

14 Claims, 8 Drawing Figures

ACCESSORY CLAMP FOR MEDICAL TABLE

BACKGROUND AND SUMMARY

Various types of clamping devices have been known in the past for releasably securing the support rod of a hanger, stirrup, arm support, or other accessory to the side rail or track of a medical table. Two such devices are illustrated in U.S. Pat. Nos. 3,046,072 and 3,339,913. Such clamps and others like them are intended to perform two separate clamping functions, one being the clamping attachment to the rail or track and the other being the clamping connection to the upstanding support rod of the accessory.

An effective clamp must not only provide secure attachment but must be easily and quickly adjustable. While prior clamping structures have usually satisfied one of these requirements, there has been an apparent lack of success in satisfying both. At the same time, power-operated medical tables have become more complex with articulated sections capable of being shifted into a wide variety of positions, thereby adding a further requirement to clamp operation, specifically, that the clamp be capable of a swivel action so that it may be adjusted to maintain the accessory support rod in vertical position (or in any other selected position of adjustment) as the patient-supporting sections of the table are repositioned. Once the support rod has been swiveled into its selected position, the clamp should be capable of being easily and quickly manipulated to lock the accessory in that position.

A main aspect of this invention lies in providing an improved clamp which may be easily manipulated by one hand to perform all three functions and, when tightened, may be relied upon to maintain the accessory in its selected position of adjustment. Since one-handed manipulation of the clamp is so readily achieved, the user's other hand is left free to hold and reposition (if necessary) the accessory. The result is a reliable and compact clamp mechanism that may be operated by one person without difficulty even though multiple adjustments must be made and the accessory itself must be supported while such adjustments are taking place.

Briefly, the clamp includes a generally cylindrical body having a cup section and a base section, the two sections being disposed in axial alignment and having a pair of opposing first ends provided with annular rows of teeth arranged to lock the two sections against independent relative rotation when their teeth are in intermeshing engagement. The cup section has a centrally-apertured transverse wall adjacent its first end and a chamber leading from that wall to an opening at the opposite (second) end of the cup section. Through the chamber extends a hollow stem which is rigidly secured at one end to the base section of the clamp. A first operating knob is threaded upon the free end portion of the stem and includes a cylindrical shank that projects into the chamber. A thrust bearing is held against the end of the shank by a compression spring disposed within the chamber, the spring also performing the function of urging the two sections of the clamp into intermeshing engagement. A pair of aligned openings formed in the cylindrical side wall of the cup section receive the support rod of the accessory to be mounted upon the medical table, such openings being generally triangular in shape so that as the first operating knob is tightened to drive the thrust bearing into engagement with that portion of the rod extending through the chamber, the rod will be wedged tightly in place within those openings. Tightening or loosening the first operating knob performs the dual functions of locking or releasing both the support rod of the accessory and the swivel mechanism, thereby allowing both longitudinal adjustment of the support rod and rotational adjustment of that rod into vertical position, horizontal position, or any selected position of inclination therebetween. A second control knob, coaxial with the first knob and disposed immediately adjacent to it, is carried by an operating shaft that extends through both sections of the clamp and terminates in a shoe located at the free end of the base section. Upon rotation of the second knob, the shoe may be shifted to engage or release the channel track extending along the side of the medical table. The shoe is spring-loaded towards a releasing position so that when the second knob is rotated to relieve the clamping force exerted upon the track, the entire clamp may be shifted along that track without objectionable restraint or noise.

Other features, advantages, and objects of the invention will become apparent from the specification and drawings.

DRAWINGS

DETAILED DESCRIPTION OF PREFERRED EMBODIMENT

Figure 1:
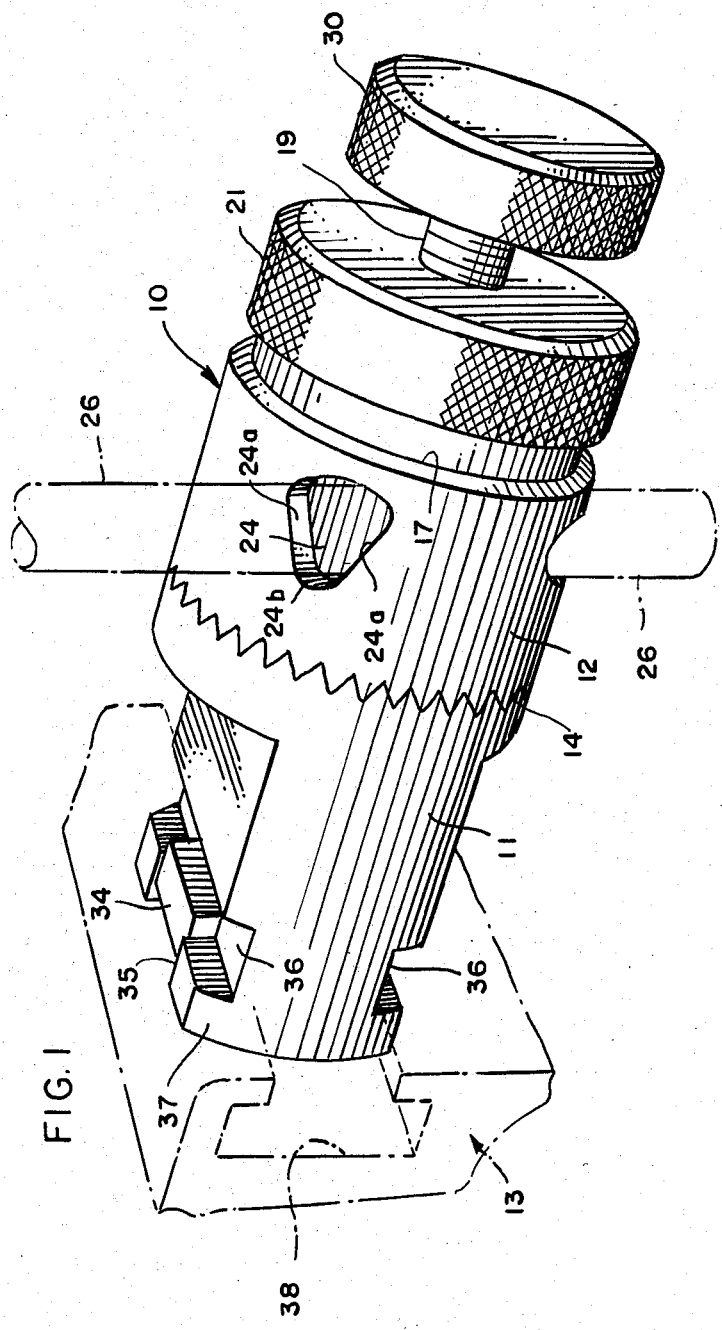
FIG. 1 is a perspective view of a clamp embodying this invention, the channel track and the accessory support rod being illustrated in phantom.

Referring to the drawings, the numeral 10 generally designates an accessory clamp having a generally cylindrical body composed of two sections—an outer cup-shaped section 12 and an inner base section 11. The terms "inner" and "outer" are used here to define the relationship of the parts with respect to the track 13 of the medical table to which the clamp is adapted to be secured with the inner section being proximal, and the outer section being distal, to that track. Also, the term "table" is used to mean any of the various types of adjustable medical tables in common use for patient examination, surgery, and other medical treatment. Such equipment is commonly referred to as a "table" although in most cases it may also function as a bed or a chair depending on the positions of the articulated sections and the particular medical and patient needs involved.

Figure 6:
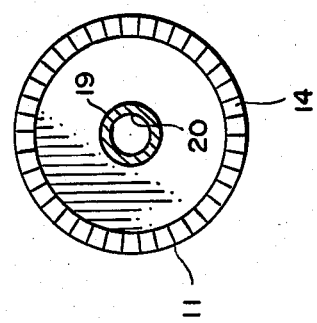
FIG. 6 is a sectional view taken along line 6—6 of FIG. 2.
Figure 3:
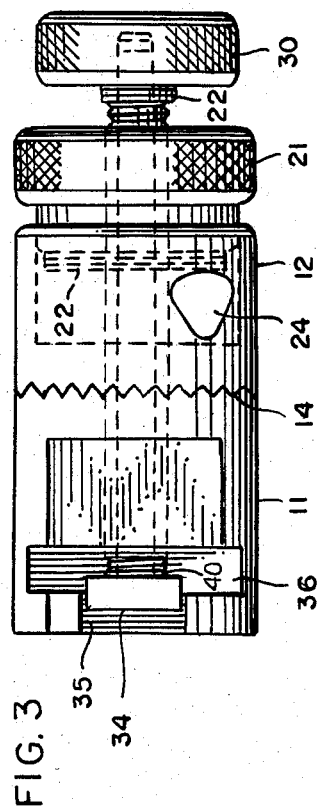
FIG. 3 is a top plan view of the clamp assembly.
Figure 4:
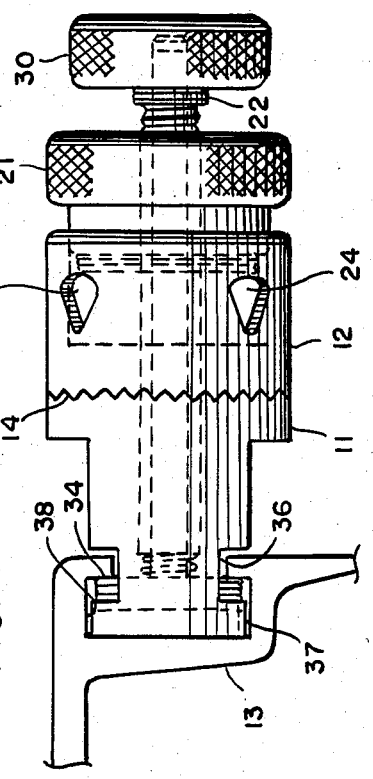
FIG. 4 is a side elevational view of the assembly.
Figure 5:
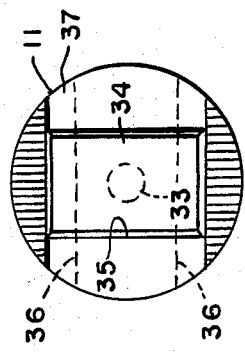
FIG. 5 is an end view taken from the proximal end of the clamp assembly.

Each clamp section 11, 12 has a first end face provided with an annular row of circumferentially arranged teeth 14, each tooth preferably being triangular when viewed in side elevation and defined by surfaces lying along radially-extending planes (FIG. 6). The teeth at the outer end of base section 11 are normally disposed in intermeshing engagement with the teeth at the inner end of cup section 12, as shown in FIGS. 1, 3, and 4.

Figure 2:
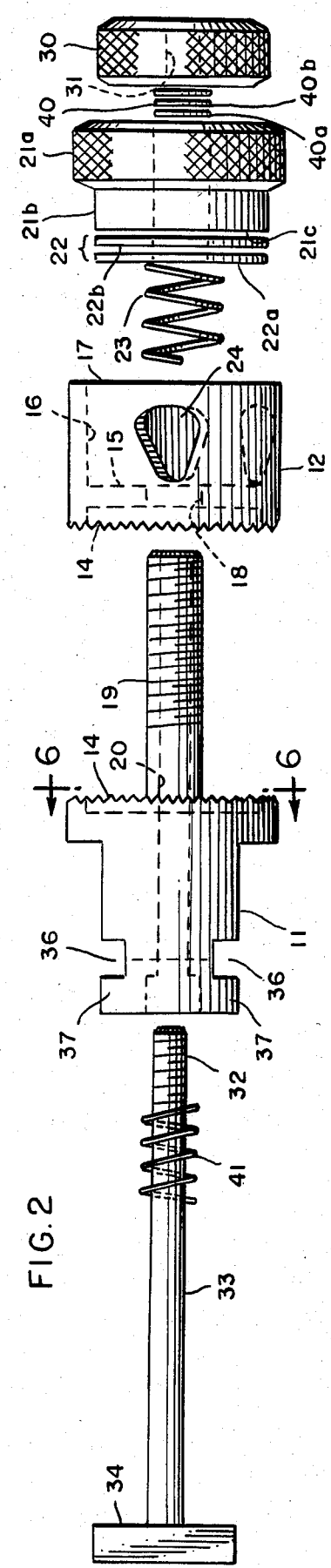
FIG. 2 is an exploded elevational view illustrating the components of the clamp assembly.
Figure 7:
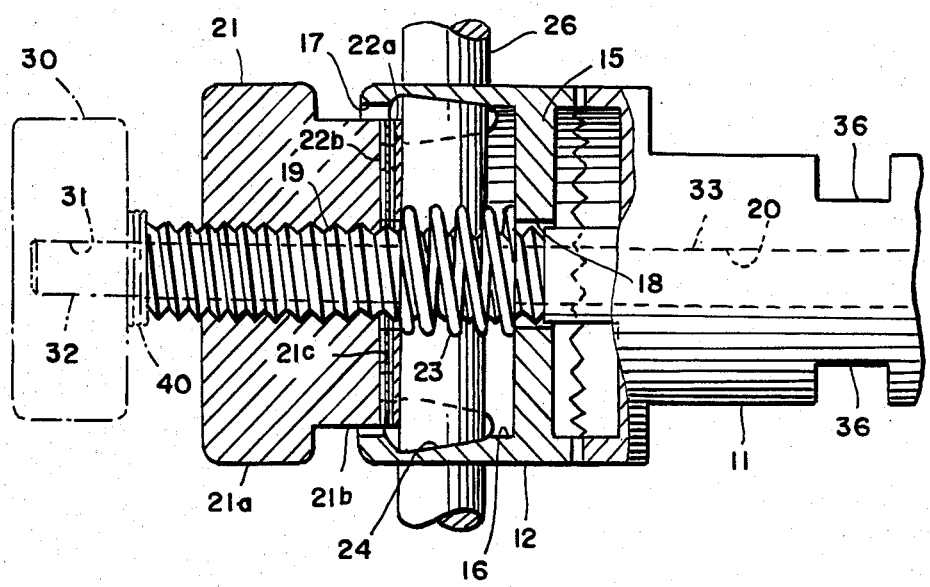
FIG. 7 is an enlarged, fragmentary, longitudinal sectional view illustrating the support rod locking and swivel locking mechanisms of the clamp (other elements being shown in broken lines).

Referring to FIGS. 2 and 7, the cup section is shown to have a transverse inner wall 15 and a cavity or chamber 16 that extends outwardly from the transverse wall to an enlarged opening 17 at the outer or second end of section 12. The transverse wall 15 has a central opening 18 through which extends an elongated axial stem 19 joined to, or formed as part of, base section 11. The axial stem is externally threaded and is hollow. As shown most clearly in FIGS. 2, 7, and 8, a bore 20 extends through the stem and continues through the remainder of base section 11.

A first control knob or handwheel 21 is threadedly mounted upon stem 19, the knob having an outer or distal portion 21a which is preferably provided with a knurled peripheral surface to help insure a slip-free operation, and an inner or proximal cylindrical shank portion 21b that extends into the chamber of cup section 12 through open mouth 17. The inner end face 21c of the knob extends along a plane normal to the knob's axis. Friction-reducing means in the form of a thrust bearing assembly 22 is carried upon stem 19 adjacent end face 21c and, in its simplest version, may take the form of one or more washers freely rotatable with respect to end face 21c. In the preferred embodiment disclosed, there are two anti-friction elements, one of them 22a being a solid washer that functions as a rigid load-distributing contact-member and the other 22b being an annular roller bearing assembly that reduces rotational friction between the washer 22a and the end face 21c of the control knob.

A helical compression spring 23 extends about stem 19 within chamber 16 between the transverse wall 15 of the cup section and the annular plate or washer 22a of the friction-reducing assembly 22. The spring is under compression when the parts are assembled and the force exerted by the spring performs the dual functions of holding the anti-friction assembly 22 against the inner face of knob 21 and of urging the teeth of cup section 12 into engagement with the mating teeth of base section 11. Except for the action of spring 23 and knob 21, cup section 11 and anti-friction means 22 would be freely slidable along stem 19. By urging these components in opposite directions along the stem, the spring 23 accomplishes the double functions described.

The cylindrical side wall of the cup section 12 is provided with a pair of aligned openings 24 of generally triangular configuration. Specifically, each opening 24 is defined in part by a pair of side edges 24a that converge inwardly or proximally towards an apex 24b (FIG. 1). The two openings are aligned so that a line passing through them lies along a plane normal to the central axis of the clamp and is offset laterally from that axis. The openings are positioned and dimensioned so that the support rod 26 of an accessory may be inserted through both of them, passing through chamber 16 alongside stem 19 and spring 23. In the best mode known for practicing the invention, there is a slight interference between spring 23 and rod 26 so that insertion of the rod causes limited lateral displacement of the contacted coils of the spring. Because of such displacement, the spring exerts limited restraining force on the rod 26; while such restraining force may be easily overcome by a user, it is enough to prevent random or unintended movements that might otherwise occur if there were no restraint at all.

When the first control knob 21 is in a loosened condition with the contact plate or washer 22a displaced outwardly out of alignment with openings 24, a user may easily insert or remove a support rod 26 from the openings of the cup-shaped section 12. Also, with the support rod so inserted, or even prior to such insertion, the cup section 12 may be rotated relative to base section 11. As such rotation occurs, the teeth 14 of the cup section ride over the teeth of the base section in a ratcheting action with slight axial movements in opposite directions being executed by the cup section. When the support rod 26 of the accessory is properly adjusted both longitudinally (usually vertically) and rotationally, the user simply tightens the first control knob 21 to drive the annular contact element or washer 22a into tight frictional engagement with the rod, the rod thus being wedged tightly against the converging surfaces or edges 24a of each opening, and the cup section 12 in turn being forced into tight intermeshing engagement with the teeth 14 of base section 11. Thus, tightening of the knob 21 performs the double functions of anchoring the support rod 26 within openings 24 and locking the teeth of the respective clamp sections in intermeshing engagement.

Figure 8:
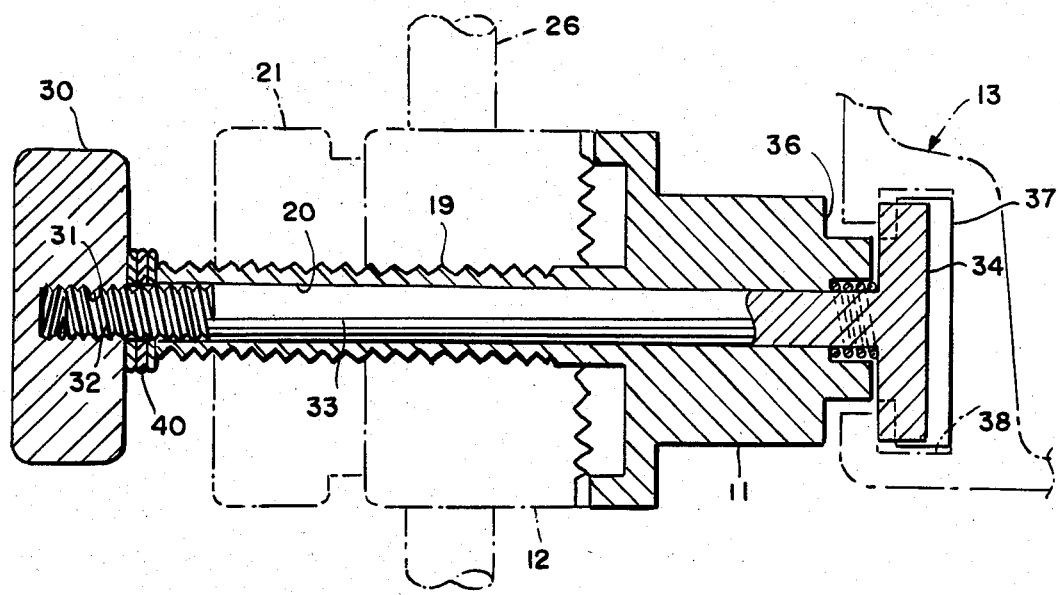
FIG. 8 is an enlarged longitudinal sectional view showing the channel rail clamping mechanism (of the device) with other elements shown in broken lines.

A second control knob 30 is located in close proximity to the first control knob 21. The two knobs are coaxial with the second control knob preferably being somewhat smaller in diameter. Knob 30 has a threaded socket 31 that receives the threaded end 32 of a control shaft 33 that extends completely through the bore 20 of base section 11 and stem 19. At its opposite end, the control shaft 33 is provided with an enlarged shoe or contact member 34 received within a recess 35 formed in the innermost, or most proximal, end portion of base section 11. Parallel notches or grooves 36 are also formed in opposite side faces of the base section to define terminal flanges 37 dimensioned to be received within the channel 38 of support track 13. The second control knob 30 may be rotated in one direction to bring the shoe or contact member 34 into generally flush alignment with terminal flanges 37; however, when rotated in the opposite direction, the knob 30 and control shaft 33 draw the shoe outwardly into notches 36, thereby effectively increasing the width of that portion of the clamp received within channel 38 and tightly locking the clamp in position in relation to the track 13 (FIGS. 1, 4, 8).

Suitable friction-reducing means 40 may be mounted upon control shaft 33 and engage both the distal end of stem 19 and control knob 30 to reduce rotational resistance. Advantageously, the friction-reducing assembly may take the form of a pair of thrust washers 40a and an annular roller bearing assembly 40b similar to the larger elements 22a and 22b carried by stem 19 as previously described. A coil spring 41 is interposed between shoe 34 and base section 11 to urge the shoe away from section 11 when control knob 30 is turned to relieve engagement between the clamp and channel track 13. The spring not only facilitates operation of the clamp assembly but, by urging the shoe into a releasing position, reduces resistance and possible chattering noise that might otherwise occur as the clamp is slid along channel 38 into a selected position of adjustment.

It is believed evident that clamp 10 may be easily and quickly manipulated to perform all three clamping or locking functions. Such operations may be performed with only one hand gripping the clamp and without requiring the user to release his (her) grip upon the clamp or even appreciably change his (her) hand position with respect to the clamp. For example, if the clamp is to be used to attach a support rod 26 to a medical table, the user simply grips the rod in one hand and the knob portion of the clamp in the other, inserts the rod 26 through openings 24 and slides the proximal end of the clamp into channel 38, and then, without removing his (her) hands from the respective elements, simply rotates one control knob and then the other with the same hand used for supporting the clamp to produce all three clamping or locking action described.

While in the foregoing we have disclosed an embodiment of the invention in considerable detail for purposes of illustration, it will be understood by those skilled in the art that many of these details may be varied without departing from the spirit and scope of the invention.

We claim:

1. A clamp for releasably securing an accessory rod to a medical table, comprising a clamp body having a cup section and a base section; said sections being disposed in axial alignment and having a pair of opposing first ends with means for locking said sections against independent relative rotation when said ends are engaged; said cup section having a centrally-apertured transverse wall adjacent said first end and having a chamber leading to an opening at a second end opposite the first end thereof; said base section having a threaded stem extending axially from said first end of said base section, through said apertured wall, and into said chamber of said cup section; a first operating knob threadedly and rotatably mounted upon the end of said stem remote from said base section; said cup section having a pair of openings in the side wall thereof aligned with each other along a line disposed lateral to said stem and along a plane normal to the axis of said body; said pair of side wall openings being adapted to receive a support rod of an accessory to be secured to a medical table by clamping engagement of such support rod when said first operating knob is tightened upon said threaded stem.

2. The clamp of claim 1 in which said side wall openings are generally triangular when viewed in cross section with each opening having side edges converging towards an apex in a direction opposite from the direction of said first operating knob.

3. The clamp of claim 1 in which said locking means at said first ends of said cup and base sections comprise annular rows of teeth arranged to lock said sections against independent relative rotation when said teeth are in forceful intermeshing engagement.

4. The clamp of claim 1 in which said first operating knob includes a shank portion projecting into said chamber through said opening; annular friction-reducing means carried by said stem within said chamber; and compression spring means extending between said friction-reducing means and said transverse wall within said chamber for simultaneously urging said friction-reducing means into engagement with said shank of said knob and urging the locking means of said respective sections into locking engagement.

5. The clamp of claim 4 in which said compression springs comprises a helical spring extending about said stem within said chamber.

6. The clamp of claim 5 in which said helical spring has at least one coil thereof projecting into the line-of-sight between said side wall openings for frictionally engaging a support rod inserted through said openings.

7. A clamp for releasably securing an accessory rod to a medical table, comprising a generally cylindrical clamp body having a cup section and a base section; said sections being disposed in axial alignment and having a pair of opposing first ends provided with locking means for securing said sections against independent relative rotation when said sections are in mutual engagement; said cup section having a centrally-apertured transverse wall adjacent the first end thereof and having a chamber leading to an opening at the opposite second end thereof; said base section having a stem extending axially from said first end of said base section, through said apertured wall, and into said chamber of said cup section; a first operating knob threadedly and rotatably mounted upon the end of said stem remote from said base section and including a shank portion projecting into said chamber through said opening; said cup section having a pair of openings in the side wall thereof aligned with each other along a line disposed lateral to said stem and along a plane normal to the axis of said cylindrical body to receive a support rod for an accessory to be clamped to a medical table; compression spring means extending between said first operating knob and said transverse wall within said chamber for urging said locking means of the respective sections into engagement; said stem and base section having a bore extending therethrough; a control shaft received within said bore; a second operating knob connected to one end of said control shaft immediately adjacent said first operating knob; and means adjacent the opposite end of said control shaft for detachably securing said base section to the supporting track of a medical table.

8. The clamp of claim 7 in which said locking means of said sections comprises annular rows of intermeshable teeth at said opposing first ends for locking said sections against independent relative rotation when said teeth are in intermeshing engagement.

9. The clamp of claim 7 in which annular friction-reducing means are loosely carried by said stem within said chamber and between said compression spring means and said first operating knob, said compression spring means urging said friction-reducing means into engagement with said shank of said first operating knob while urging said locking means of the respective sections into interlocking engagement.

10. The clamp of claim 7 in which said second operating knob is coaxial with but smaller in diameter than said first operating knob.

11. The clamp of claim 7 in which said second operating knob is threadedly and rotatably mounted upon said control shaft to urge said shaft axially within said bore when said second operating knob is rotated.

12. The clamp of claim 11 in which said last-mentioned means includes a contact shoe secured to the end of said control shaft opposite from said second operating knob.

13. The clamp of claim 12 in which a compression spring is interposed between said contact shoe and said base section to urge said shoe away from said base section and said second operating knob towards said stem and said first operating knob.

14. The clamp of claim 13 in which second friction-reducing means extends about said control shaft and is disposed between said second operating knob and said stem to reduce rotational resistance of said second operating knob.

* * * * *